United States Patent [19]
Olander

[11] 3,972,851
[45] Aug. 3, 1976

[54] PREPARATION OF POLYPHENYLENE OXIDE USING A MANGANESE(II) ORTHO-HYDROXYARENE-OXIME CHELATE REACTION PROMOTER

[75] Inventor: Walter K. Olander, Elnora, N.Y.

[73] Assignee: General Electric Company, Schenectady, N.Y.

[22] Filed: July 24, 1974

[21] Appl. No.: 491,475

[52] U.S. Cl. .................. 260/47 ET; 260/33.8 R; 260/29.2 N; 260/32.4; 260/32.6 R
[51] Int. Cl.$^2$ .......................................... C08G 65/44
[58] Field of Search ................................ 260/47 ET

[56] References Cited
UNITED STATES PATENTS

| | | | |
|---|---|---|---|
| 3,444,133 | 5/1969 | Behr et al. | 260/47 |
| 3,825,521 | 7/1974 | Izawa et al. | 260/47 |

OTHER PUBLICATIONS
Shono et al., Makromol. Chem. 105, 277–279, (1967).

Primary Examiner—Howard E. Schain
Attorney, Agent, or Firm—F. Wesley Turner; Joseph T. Cohen; Jerome C. Squillaro

[57] ABSTRACT

A process for the preparation of polyphenylene oxide employing a manganese (II) ortho-hydroxyareneoxime chelate catalyst is described. The process can be effectively carried out both in the absence as well as in the presence of amines. The process is economical and useful in the production of polyphenylene oxide resins.

18 Claims, No Drawings

PREPARATION OF POLYPHENYLENE OXIDE USING A MANGANESE(II) ORTHO-HYDROXYARENE-OXIME CHELATE REACTION PROMOTER

This invention relates to a process of forming self-condensation products of a phenol under polymer forming reaction conditions to a polyphenylene oxide in the presence of a manganese(II) chelate complex having the formula: $(L)_x Mn$, wherein L is an ligand derived from an ortho-hydroxyareneoxime, Mn is the transition metal manganese(II), and x is a positive integer at least equal to about 0.5. The ligand forming ortho-hydroxyareneoximes can be described by the general formula:

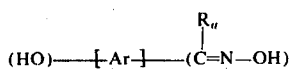  Formula I.

wherein $R_a$ is independently selected from the group consisting of hydrogen and lower alkyl radicals having from 1 to 5 carbon atoms, Ar is at least a divalent arene radical having at least one -OH radical and at least one

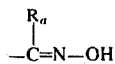

radical attached directly to ortho positioned arene ring carbon atoms. In a preferred embodiment the manganese(II) chelate is derived from an ortho-hydroxyareneoxime of Formula I subject to the proviso that Ar is a monocyclic arene radical and that $R_a$ is a lower alkyl radical having from 1 to 2 carbon atoms.

In general, the prior art has determined that first series transition metals such as copper, cobalt, manganese, etc., can be beneficially employed under certain reaction conditions to promote the oxidative coupling of phenols to form polyphenylene oxides (also commonly referred to as polyphenylene ethers). Representative of prior art teachings describing the use of such catalyst systems are U.S. patents Hay U.S. Pat. No. 3,306,874 and U.S. Pat. No. 3,306,875; Bussink U.S. Pat. No. 3,337,501; Behr U.S. Pat. No. 3,444,133; Kobayashi U.S. Pat. No. 3,455,880; Nakashio U.S. Pat. No. 3,573,257; Nishioka U.S. Pat. No. 3,787,358; Izawa U.S. Pat. No. 3,793,246; and Belgium Patent Kanegafuchi No. 776,044.

Unexpectedly, it has been found that a highly efficient polyphenylene oxide process is provided wherein certain manganese(II) chelates ae used to catalyse the rate of polyphenylene oxide formation during the self-condensation of phenols.

In essence, my invention comprises the oxidative coupling of a phenol under polymer forming reaction conditions to produce a polyphenylene oxide wherein the process is carried out in the presence of a manganese(II) chelate complex having the formula: $(L)_x Mn$, wherein L is a ligand derived from an ortho-hydroxyareneoxime, Mn is the transition metal manganese(II), and x is a positive integer at least equal to about 0.5. The ligand forming ortho-hydroxyareneoxime can be selected from the group consisting of the formula:

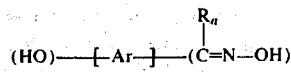  Formula I.

wherein $R_a$ is independently selected from the group consisting of hydrogen and lower alkyl radicals having from 1 to 5 carbon atoms, Ar is at least a divalent arene radical having at least one —OH radical and at least one

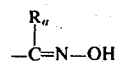

radical attached directly to ortho positioned arene ring carbon atoms. In a preferred embodiment the manganese(II) chelate is derived from an ortho-hydroxyareneoxime of Formula I subject to the proviso that Ar is a monocyclic arene radical and that $R_a$ is a lower alkyl radical having from 1 to 2 carbon atoms.

The manganese(II) chelates can be employed in a mono, bis, tris, tetrakis, etc. ligand form wherein one, two, three, four, etc. bidentate ligands, i.e., bidentate ligand being defined herein as the cyclic ring structure which arises from the union of a manganese(II) atom with a single oxime nitrogen atom of a

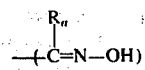

radical and a single hydroxy oxygen atom of an —(OH) radical associated with a single ortho-hydroxyareneoxime ligand forming molecule. Often, manganese(II) chelates, preferably, are employed in their bis-bidentate form wherein two cyclic ring structures arise from the union of a single Mn(II) atom with two separate and distinct ortho-hydroxyareneoxime molecules. Illustrative of Mn(II) chelates in mono-bi-dentate and bis-bidentate form are the chelates described by formulas II. and III., respectively, set out hereafter.

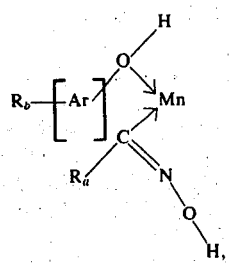  Formula II.

and

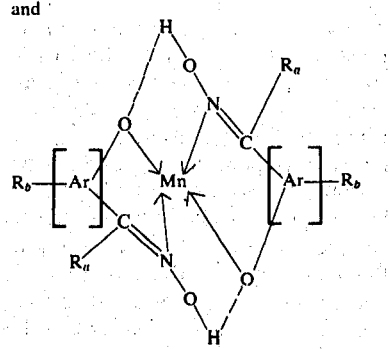  Formula III.

wherein $R_a$ and Ar are the same as defined hereinbefore, and $R_b$ is selected from the group consisting of hydrogen or alkyl, cycloalkyl, aryl, amino, monoalkylamino, dialkylamino, halide, hydroxy, alkoxy, alkanoate radicals, and combinations thereof.

The manganese(II) chelates can be prepared by any method known to those skilled in the art which introduces a divalent manganese ion, commonly referred to as Mn(II) or as $Mn^{++}$, to an ortho-hydroxyareneoxime ligand group, i.e., any appropriate ortho-hydroxyarenealkoxime or ketoxime of the Formula I, or any mixture thereof. In general, any amount of manganese(II) and ortho-hydroxyareneoxime can be combined in the preparation of the Mn(II) chelate, however, an amount sufficient to form a Mn(II) bis-bi dentate ligand chelate ring type is preferably employed. The aforesaid aldoxime or ketoxime reactant can be prepared by any method well-known to those skilled in the art, such as by the well-known reactions of a hydroxylamine with an ortho-hydroxyarenealdehyde or an ortho-hydroxyarenealdehyde, e.g. 1-hydroxy-8-naphthalene carboaldehyde, ortho-hydroxy-para-methoxybenzene carbaldehyde, etc. or ortho-hydroxyacetophenone, ortho-hydroxypropiophenone, 1'-hydroxy-8'-butyronaphthone, etc., respectively. In the preparation of the effective Mn(II) chelate, a Mn(II) ion associated with an ortho-hydroxyareneoxime donor ligand atom can be derived from any Mn(II) compound which is at least partially dispersible or soluble in an ortho-hydroxyareneoxime solution. Representative Mn(II) compounds include Mn(II) halides such as Mn(II) chloride (also known as manganous chloride), Mn(II) bromide, Mn(II) iodide, etc., as well as other Mn(II) componds, such as Mn(II) carbonate, Mn(II) oxalate, Mn(II) sulfate, Mn(II) acetate, Mn(II) nitrate, Mn(II) phosphates, etc., including hydrated forms of such Mn(II) compounds.

A currently preferred method of preparing Mn(II) ortho-hydroxyareneoxime chelates comprises the formation of a solution of a Mn(II) compound and a ligand forming orthohydroxyareneoxime molecule in a suitable solvent, such as methanol, chlorobenzene, toluene, and xylene, etc. or mixtures thereof. Although not critical to the formation of an effective Mn(II) chelate reaction catalyst, it is presently preferred after formation of the Mn(II) chelate in solution that an inorganic base be added to the solution in an amount at least sufficient to maintain a weakly basis Mn(II) chelate solution. It is believed, although not wishing to limit this invention by any theory, that the addition of an inorganic base, such as an alkali metal hydroxide or alkoxide to the Mn(II) chelate solution facilitates the possible formation of O . . . H—O bridges via hydrogen bonding, as illustrated hereinbefore by Formula III. illustrating a Mn(II) bis-bidentate chelate molecule. Dissociation of bridging protons, it is further postulated — at some point in the polymerization of a phenol to a polyphenylene oxide — maybe an important link in the effectiveness of the Mn(II) chelates when employed in the process of this invention. As represented by the structure of Formula III., set out hereinbefore, it appears that the oxygen of the oxime group, >C=N—OH, associated with an ortho-hydroxyareneoxime ligand influences not only the properties of its associated oxime nitrogen atom but also influences hydrogen bonding O . . . H with a bridged hydrogen atom derived from hydroxyl group of another ortho-hydroxyareneoxime ligand.

The possibility of formation of multiple rings, i.e. five- or six-membered chelate rings closely associated with hydrogen bonding is believed — especially with the five-membered chelate rings — to markedly increase the stability and effectiveness of Mn(II) chelates in promoting the condensation of a phenol to a polyphenylene oxide.

The arene radical of the ortho-hydroxyareneoxime of Formula I can be any monocyclic or polycyclic organic radical having any other substituents other than hydrogen, at least one -OH radical and at least

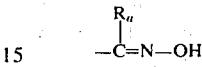

radicals, attached directly to cyclic ring carbon atoms subject to the proviso that the substituents do not interfere with the effectiveness of the Mn(II) ortho-hydroxyareneoxime as a catalyst for the self-condensation of a phenol to a polyphenylene oxide. Accordingly, the arene substituents can be (1).(a) any acyclic or cyclic organic radical, e.g. alkyl, cycloalkyl, aryl, aralkyl, alkaryl, alkcycloalkyl, cycloalkaryl radicals or combinations thereof, etc., including acyclic and cyclic radicals having any noninterfering constituents; (1).(b) such as amino, i.e. —$NH_2$; monoalkylamino, i.e. —$NHR^1$; dialkylamino, i.e. —$N(R^1)_2$; halide, i.e. —Cl, —Br, —I; hydroxy, i.e. —OH; alkoxy, i.e. —$OR^1$; and alkanoate, i.e. —$OOCR^1$ radicals, $R^1$ in all cases being an alkyl group; or (1).(c) any non-interfering constituent as illustrated by (1).(a) hereinbefore. Preferably, the arene radicals contain from about 6 to about 30, more preferably from about 6 to about 15, and even more preferably from about 6 to about 9 carbon atoms. Illustrative of individual arene radicals are the following: phenylene, methylphenylene, dimethylphenylene, ethylphenylene, propylphenylene, butylphenylene, pentylphenylene, decylphenylene, tetracosylphenylene, aminophenylene, hydroxyphenylene, methoxyphenylene, hexanotephenylene, dibutylaminophenylene, ethoxyphenylene, cyclohexylphenylene, phenylphenylene, chlorophenylene, methylnaphthalene, pentylnaphthalene, decylnaphthalene, pentadecylnaphthalene, eicosylnaphthalene, dimethylnaphthalene, methylamino-3-propyl naphthalene, etc. Illustrative of ortho-hydroxyareneoxime ligand forming molecules which contain an arene radical as defined above that can be employed to prepare Mn(II) chelates follow:

Formula V.

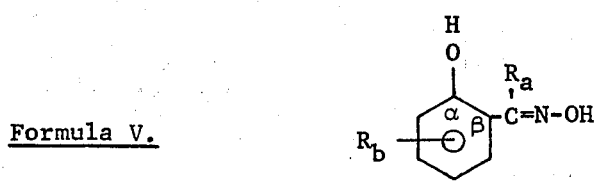

Formula VI.

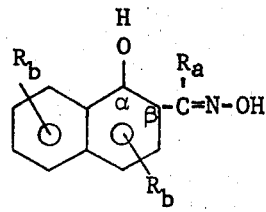

Formula VII.

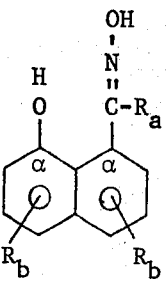

Formula VIII.

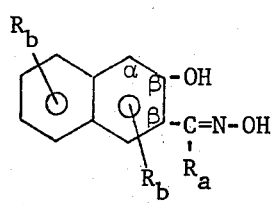

wherein $R_a$ and $R_b$ are as defined hereinbefore. As illustrated by Formulas V through VIII, as used in Formula I both in the written description and in the appended claims with reference to Ar being at least a divalent radical having at least one —OH radical and at least one

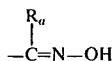

radical attached directly to ortho positioned arene ring carbon atoms, at least one combination of hydroxy and oxime radicals are attached directly to carbon atoms located at $\alpha,\alpha$, $\alpha,\beta$, or $\beta,\beta$ positions of cyclic and polycyclic aromatic compounds. The carbon chain or ring location of any other substituent, e.g. an $R_b$ radical of Formula V. through VIII., is not critical to the effectiveness of the Mn(II) orthohydroxyareneoxime chelates in the process of this invention.

The process of forming the self-condensation products of phenol in accordance with this invention comprises reacting oxygen with a phenol having the structural formula Formula IX.

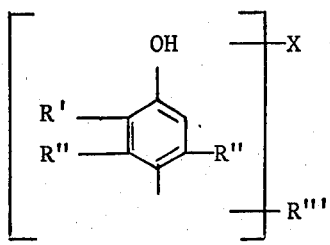

where X is a substituent selected from the group consisting of hydrogen, chlorine, bromine, and iodine; R' is a monovalent constituent selected from the group consisting of hydrogen, hydrocarbon radicals, halohydrocarbon radicals having at least 2 carbon atoms between the halogen atoms and phenol nucleus, hydrocarbonoxy radicals, and halohydrocarbonoxy radicals having at least 2 carbon atoms between the halogen atoms and phenol nucleus, R'' and R''' being the same as R' and, in addition, halogen, wherein the reacting is carried out in the presence of a basic solution of a manganese(II) ortho-hydroxyareneoxime chelate in which the phenol is soluble.

Representative of phenols of Formula IX., among others, which can be employed alone or in admixture are the following: 2,6-dimethylphenol, 2,6-diethylphenol, the 2,6-dibutylphenols, 2,6-dilaurylphenol, the 2,6-dipropylphenols, 2,6-diphenylphenol, 2,6-dimethoxyphenol, 2,3,6-dimethylphenol, 2,3,5,6-tetramethylphenol, 2,6-diethoxyphenol, 2-methoxy-6-ethoxyphenol, 2-ethyl-4-stearyloxyphenol, the 2,6-di-(chlorophenoxy)phenols, 2,6-dimethyl-3-chlorophenol, 2,3-dimethyl-4-chlorophenol, 2,6-dimethyl-3-chloro-5-bromophenol, 2,6-di-(chloroethyl)phenol, 2-metyl-6-isobutylphenol, 2-methyl-6-phenylphenol, 2,6-dibenzylphenol, 2,6-ditolylphenol, 2,6-di-(chloropropyl)-phenol, 2,6-di-(2',4'-dichlorophenyl)-3-allyl-phenol, etc. Other specific examples of other phenols of Formula IX. are described in U.S. Pat. No. 3,306,875 and are hereby incorporated herein in their entirety by reference. An especially presently preferred phenol in the practice of this invention is 2,6-dimethylphenol (also known as 2,6-xylenol) because of its extended use in current polyphenylene oxide production.

As indicated hereinbefore, the Mn(II) ortho-hydroxyareneoxime chelate is employed in a phenol soluble solution during self-condensation of a phenol to form a polyphenylene oxide. Any liquid can be employed to form a solution of phenol and Mn(II) chelate, including well-known solvents, such as alcohols, ketones, hydrocarbons, chlorohydrocarbons, nitro aromatic hydrocarbons, ethers, sulfoxides, etc., subject to the proviso that the solvents do not interfere with the catalyst activity of the Mn(II) chelate in the preparation of the polyphenylene oxide. Since the solvent for the phenol and the Mn(II) chelate does not need to act as a solvent for the polymer, it may be desirable sometimes to use a solvent system such as toluene, xylene, chlorobenzene, or nitrobenzene or mixtures thereof with methanol as a solvent system in order to cause the polymer to precipitate from the reaction medium while permitting lower molecular weight polymers to remain in solution until they form higher molecular weight polymers. The relative proportion of phenol to solvent can vary widely. Generally, presently acceptable economic reaction parameters comprise mole proportion of phenol:solvent within the range of from about 20:80 to about 5.95. Presently preferred phenol:solvent mole proportions are within the range of from about 15:85 to about 10:90.

In order to carry out the Mn(II) chelate promoted self-condensation of phenol to polyphenylene oxide the self-condensation reaction must be carried out in a basic reaction media, such as that provided by the presence of a strong alkali metal base, e.g. alkali metal hydroxides, alkali metal alkoxides, etc. or mixtures thereof. Commercially available alkali metal bases which are readily attainable are presently preferred, such as sodium hydroxide, potassium hydroxide, lithium hydroxide, sodium methoxide, etc. Currently, it is preferred that anhydrous sodium hydroxide solution —however an aqueous, e.g. 50 percent, sodium hydroxide solution can be employed for convenience — be employed to provide the strong basic reaction environment essential to the polymerization reaction. The quantity of alkali metal base which is essential to the promotion of the self-condensation reaction can readily be determined without undue experimentation by those skilled in the art. In general, however, suitable phenol:alkali metal base mole ratios are within the range of from about 1:1 to 100:1, preferably from about 40:1 to about 5:1, and even more preferably from about 20:1 to about 10:1. In the preparation of polyphenylene oxide from 2,6-xylenol, optimum overall process reaction conditions, generally, establish the desirability of employing a 2,6-xylenol: alkali metal hydroxide mole ratio within the range of from about 14:1 to about 18:1.

In general, the mole proportions of phenol:Mn(II) chelate can vary widely to provide any desired — including minumum, maximum or optimum — degree of promotion of the reaction rate of phenols to polyphenylene oxide. Although not wishing to limit this invention by any theory, it is believed that the Mn(II) chelate reaction promoter functions as a true catalyst which remains essentially unconsumed or unchanged, e.g. a Mn(II) compound which is neither hydrolyzed nor dissociated due to thermal or other effects into a noncatalytic form, e.g. during the self-condensation process. Apparently, the reason that the Mn(II) chelate behaves as a true catalyst is due to the unexpected stability of the Mn(II) five- or six-membered ortho-hydroxyareneoxime chelate rings during preparation of thepolyphenylene oxides.

Advantageously and unexpectedly, it has been found that the Mn(II) chelate catalyst can be employed in very small amounts relative to the amount of phenol reactant while maintaining and often improving the rate of formation of a polyphenylene oxide compared to the rate of polyphenylene oxide formation associated with prior art processes. In general, however, subject to variations in accordance with the type of ortho-hydroxyareneoxime ligand associated with the Mn(II) chelate, reaction rates comparable to those of the prior art can be obtained wherein the phenol to Mn(II) chelate mole ratio is within the range of from as low a about 50:1 to as high as about 350:1, or even as high as about 700:1 wherein the reactions are carried out under either (a) superatmospheric, or (b) in the presence of certain primaryamines, or even as high as about 1400:1 wherein the reactions are carried out under both (a) superatmospheric pressure, and (b) in the presence of certain primary amines.

In general, it is preferred that minimum quantities of Mn(II) chelate be employed in order to avoid the sometimes necessary separation and/or recovery of catalyst residue from the polyphenylene oxide reaction products. Accordingly, it is preferred that the initial reaction media mole ratio of phenol:manganese to be at least about 50:1, more preferably at least 100:1, and even more preferably at least 350:1, wherein this process is carried out at (a) atmospheric or subatmospheric pressures and (b) in the absence of certain primary amines.

Both in the specification and the appended claims wherein phenol:manganese(II) numerical ratios are described, it is to be understood that the numerical proportions described the number of moles of phenol relative to the number of atoms of manganese(II) associated with the Mn(II) chelate independent of the chelate form, i.e., mono-bidentate, bis-budentate, etc.

In general, the reaction temperature employed in the preparation of polyphenylene oxide in the presence of the Mn(II) chelate catalyst can be varied widely. Suitable polymerization temperatures generally fall within the range of from about 0° to about 50°C., preferably within the range of from about 10° to about 40°C., and more preferably within the range of from about 20° to 30°C. since generally optimum self-condensation reaction rates have been found to exist within the 20° to 30°C. temperature range. Because the self-condensation reactions are exothermic in nature and the Mn(II) chelates are susceptible to thermal deactivation, it is generally desirable to program the addition of the Mn(II) chelate catalyst and the phenolic monomeric reactant during their initial contact within the reaction media. This programmed addition permits a suitable reaction temperature profile to be obtained whereby the reaction is maintained within a temperature range suited to optimum catalyst efficiency and optimum yields of polyphenylene oxide resin. In general, more latitude with regard to the upper limits of the reaction temperature range can be obtained wherein the process is carried out at superatmospheric pressures, e.g., 1 to 40 psig, 1 to 1000 psig, or even higher temperatures. In the event that the self-condensation reaction is discontinued or interrupted due to deactivation of the Mn(II) chelate at elevated temperatures, the reaction can be resumed in a normal fashion by reducing the temperatures of reaction media and adding thereto additional manganese(II) chelate catalyst in the amounts required to initiate and maintain the desired catalyst efficiency.

Although certain primary, secondary or tertiary amines, such as those disclosed in U.S. Pat. Nos. 3,306,874, 3,306,875, 3,384,619, 3,636,656 and 3,646,699, etc., have been taught by the prior art as being essential to the catalytic oxidative coupling of phenols carried out in the presence of certain copper-amine complexes in the preparation of polyphenylene oxide, it is unessential that any amine be employed in combination with a Mn(II) chelate catalyst in the preparation of polyphenylene oxide in accordance with the process of this invention.

Quite unexpectedly, it has been found that the use of a primary amine in combination with the Mn(II) chelate catalyst of the process of this invention increases substantially the rate of self-condensation of phenols in comparison to reaction rates associated with the use of the Mn(II) chelate catalyst in the absence of a primary amine. Because of the improvement in the reaction rates, wherein Mn(II) chelate-amine combinations are used in this invention, the amount of Mn(II) chelate catalyst employed can be substantially reduced — thereby increasing the phenol to Mn(II) chelate ratio — while still maintaining a polyphenylene oxide reaction rate comparable to that found in the absence of a primary amine.

That the above effect of a primary amine is quite unexpected is substantiated by the finding that when a secondary amine — such as those commonly employed in the copper-amine complexes of the aforementioned prior art — is substituted for a rate enhancing primary amine as described in the invention, that the Mn(II) chelate catalyst activity is unaffected or even moderately decreased.

The primary amine classes which can be employed include any primary mono- or polyamine of the following formula:

Formula X $\qquad\qquad\qquad R^2-(-NH_2)_y$ wherein $R^2$ is selected from mono- or polyvalent aliphatic and aromatic radicals, or combinations thereof, $y$ is a positive integer equal to at least 1, subject to the proviso that (a) at least three carbon atoms separate any amino (—NH₂) group from any other amino (—NH₂) group, and (b) at least two carbon atoms separate any amino group (—NH₂) from any other nucleophile. As used herein and in the appended claims, the term "any other nucleophile" is intended to describe and include any electron releasing group selected from the group consisting of monoalkylamino, —NHR¹; dialkylamino, —N(R¹)₂; hydroxy, —OH; alkoxy, —OR¹; or alkanoate, —OOCR¹ group; R¹ in all instances being an alkyl group. More specific descriptions, including examples, of individual mono- and polyamines, of Formula V. follows:

methylamine,
ethylamine,
2-hydroxyethylamine,
2-methylaminoethylamine,
n-propylamine,
isopropylamine,
tertiary-butylamine,
cyclobutylamine,
1,4-butanediamine,
4-hydroxybutylamine,
4-ethoxybutylamine,
n-pentylamine,
1,5-pentanediamine,
cyclopentylamine,
n-hexylamine,
4-isopropylcyclohexylamine,
bis(3-aminopropyl)sulfide,
1,4-cyclohexanediamine,
N-methyl-bis(3-aminopropyl)amine,
3-methoxyhexamethylenediamine,
benzylamine,
1,3-phenylenediamine,
1,3-xylenediamine — also known as 1,3-bis(aminomethyl)benzene,
1,3-bis(aminomethyl)cyclohexane,
1,2-bis(3-aminopropoxy)ethane,
3-methylheptamethylenediamine,
1,8-octanediamine,
4-isopropyl-1,3-phenylenediamine,
bis (4,4'-aminocyclohexyl)methane,
1,5-diaminonaphthalene,
bis(3,3'-aminophenyl)methane,
bis(4,4'-aminophenyl)methane,
5-hydroxynonamethylenediamine,
4,4'-diaminodiphenylsulfide,
4,4'-diaminodiphenylsulfone,
4,4'-diaminodiphenylether,
3,3'-dimethylbenzidine,
3,3'-dimethoxybenzidine,
4,4'-diaminodiphenylmethane,
bis(p-β-amino-t-butylpheyl)ether,
n-eicosylamine,
1,20-eicosanediamine,
1,30-tricontanediamine, etc.

Preferably, the primary amines are mono- or polyamino substituted aliphatic or aromatic molecules having other than hydrogen, only amino (—NH₂) nucleophilic substituents attached to carbon atoms. Particularly preferred amines are polyamino (—NH₂) substituted mono- and polycyclic aromatic compounds wherein the amino groups are bonded directly to either an aromatic ring carbon atom or to an aliphatic group that is bonded to an aromatic ring carbon atom. Presently preferred, Type A, and more preferred, Type B, polyamino (—NH₂) substituted mono- and polycyclic aromatic compounds can be represented by the following formulas:

| | Formula | Type A | Type B |
|---|---|---|---|
| XI(a). | ⌬–(Z)ₚ | p is ≧ 2 | p is 2 |
| XI(b). | ⌬S–(Z)ₚ | p is ≧ 2 | p is 2 |
| XII(a). | (Z)ₚ–⌬–⌬–(Z)ₚ | p is ≧ 1 | p is 1 |
| XII(b). | (Z)ₚ–⌬S–S⌬–(Z)ₚ | p is ≧ 1 | p is 1 |
| XIII(a). | (Z)ₚ (Z)ₚ fused bicyclic | p is ≧ 1 | p is 1 |

| Formula | | Type A | Type B |
|---|---|---|---|
| XIII(b). | [structure: fused bicyclic with S, S and $(Z)_p$, $(Z)_p$] | p is $\geq$ 1 | p is 1 |
| XIV(a). | [structure: two benzene rings connected by Y, with $(Z)_p$, $(Z)_p$] | y in XIV(a). and XIV(b). is $C_{1-6}$ alkylene, —O—, —S—, | Y in XIV(a). and XIV(b). is the same as in |
| XIV(b). | [structure: two rings with S, connected by Y, with $(Z)_p$, $(Z)_p$] | —SO$_2$—, NR$^3$, wherein R$^3$ is $C_{1-6}$ alkyl radical P is $\geq$ 1 | Formula XIV(a) and XIV(b) Type A p is 1 | wherein Formulas XI. through XIV., each Z is independently selected from —NH$_2$ and —R$^4$-NH$_2$ radicals, R$^4$ being a $C_{1-6}$ alkylene radical. Specific examples of polyamines of Formulas XI: to XIV. compounds include 1,3-bis-($\beta$-aminoethyl)benzene; 1,4-bis($\gamma$-amino-n-hexyl)benzene; 3,3',5,5'-tetraaminobiphenyl; 1,8-bis($\beta$-amino-n-butyl)naphthalene; 1,3-phenylenediamine; 1,4-phenylenediamine; 4,4'-diaminodiphenylpropane; 4,4'-diaminodiphenylmethane (also known as methylenedianiline); benzidine; 4,4'-diaminodiphenylsulfide; 3,3',5,5'-tetraaminodiphenylsulfone; 4,4'-diaminodiphenylether; 1,5-diaminonaphthalene; etc.

In general, when aliphatic mono- or polyamines are employed, I prefer that the amines be straight chain hydrocarbon groups having from about 1 to about 30 carbon atoms, more preferably having from about 4 to about 15 carbon atoms. Wherein aromatic amines are used, I prefer that the aromatic amines have from about 7 to about 30 carbon atoms, and more preferably have from about 7 to about 15 carbon atoms.

In general, the amount of amines employed in the practice of this invention can vary widely. Presently preferred mole ratios of phenols:amines are within the range of from about 100:0.05 to about 100:1.5.

In general, it has been found that the use of aliphatic diamines can reduce polyphenylene oxide reaction time by as much as ½ of the reaction time generally found when aliphatic monoamines are employed as Mn(II) chelate rate enhancers, and that the use of aromatic diamines can further reduce the polyphenylene oxide reaction time by as much as ½ of the reaction time generally found when aliphatic diamines are used as the Mn(II) chelate rate enhancers. As will be apparent to those skilled in the art, the variations in both the amounts and types of Mn(II) chelates and primary amines employed in order to acquire any desired degree of reaction rate promotion is essentially unlimited In order that those skilled in the art may better understand my invention, the following examples are given which are illustrative of the practice of this invention, however, these examples are not intended to limit the invention in any manner whatsoever. In all the examples, all parts are by weight unless otherwise stated and the following general procedure was employed. For purposes of brevity, only deviations from this procedure will be set out in the examples.

General Procedure

A solution of a phenol, e.g. 2,6-xylenol and a phenol-solvent, e.g. toluene, is charged to a reactor. Stoichiometric amounts, sufficient to form a tetradentate chelate, of a manganese(II) compound, e.g. manganese(II) dichloride and a chelate ligand forming molecule, e.g. salicylaldoxime, are combined and dissolved in a minimum amount of a Mn(II) chelate-solvent, e.g. methanol. After the Mn(II) chelate-solvent solution is complete, an amount of a phenol-solvent equal to the Mn(II) chelate-solvent is added thereto. A stream of oxygen is introduced into the reactor at ambient temperature at a rate fast enough to provide sufficient oxygen to be in excess over that being absorbed while vigorously stirring the solution. The manganese chelate catalyst solution is then added to the 2,6-xylenol toluene solution. A 50% aqueous sodium hydroxide solution taken up in methanol is added to the reactor in an amount sufficient to provide a 16:1 phenol to OH$^-$ mole ratio during the preparation of the polyphenylene oxide.

After initiation of the polymerization reaction, the reaction is regulated so that the reaction medium temperature does not exceed substantially 45° C., preferably 35° C. When a polyphenylene oxide intrinsic viscosity of about at least 0.45 as measured in chloroform at 25° C. is obtained, the reaction is stopped by adding to the reaction sufficient aqueous acetic or sulfuric acid to neutralize the reaction media. After neutralization, the entire reaction mixture is precipitated with a suitable solvent, e.g. methanol. The viscosity of the polyphenylene oxide during the polymerization reaction is monitored by correlation of the increase in efflux time of the polymer with a corresponding increase in efflux time of a standard volume of polymer solution in a calibrated pipette.

EXAMPLE I

10 Grams of 2,6-xylenol was dissolved in 73.4 milliliters of toluene and charged to a reactor. The temperature of the 2,6-xylenol toluene solution was raised to 25° C. and an oxygen flow through the reaction media was established at about a 0.4 SCFH. A Mn(II) bis(-salicylaldoxime) chelate catalyst was prepared by dissolving 0.1031 grams of manganese(II) chloride and 0.224 grams of salicylalodoxime in 8 ml. of methanol. An equal volume of toluene, i.e. 8 ml., was added to the Mn(II) chelate-methanol solution and the Mn(II) chelate-methanol-toluene solution was added to the reaction media. 0.4 Grams of a 50% aqueous sodium hydroxide solution taken up in 3.4 milliliters of methanol was added to the reaction media. After 120 minutes, polymerization was quenched with 1.2 grams of glacial acetic acid in an equal weight of water. The methanol precipitated polymer, prepared during the total reaction time period of minutes, had a final intrinsic viscosity of 0.67 in chloroform at 25° C. Polyphenylene oxide having approximately 100 recurring polyphenylene ether units derived from the polymerization of 2,6-xylenol has an intrinsic viscosity of about 0.3 when measured in chloroform at 25°C. A total of 10 grams of 2,6-xylenol, 93.4 ml. of toluene, and 11.4 ml. of methanol were charged to the reactor during the polymerization, i.e. at a 10% solids concentration. The reaction parameter mole ratio of 2,6-xylenol:Mn(II) was 100:1.

EXAMPLE II

10 Grams of 2,6-xylenol, 93.4 ml. of toluene, 11.4 ml. of methanol, 0.10312 g. of manganese(II) chloride, 0.28127 g. of 2-hydroxy-5-chlorophenylaldoxime and 0.4 g of 50% aqueous sodium hydroxide were employed in the preparation of polyphenylene oxide. After 96 minutes the polymerization was neutralized with acetic acid and methanol precipitated. The precipitated polymer, prepared during a total reaction time period of 96 minutes, had a final intrinsic viscosity of 0.64 in chloroform at 25°C. The mole ratio of 2,6-xylenol:Mn(II) was 100:1.

EXAMPLE III

10 Grams of 2,6-xylenol, 93.4 ml. of toluene, 11.4 ml. of methanol, 0.10312 g. of manganese(II) chloride, 0.35392 g. of 2-hydroxy-5-bromophenylaldoxime and 0.4 g. of 50% aqueous sodium hydroxide were employed in the preparation of polyphenylene oxide. After 90 minutes the polymerization was neutralized with acetic acid and methanol precipitated. The precipitated polymer had a final intrinsic viscosity of 0.50 in chloroform at 25°C. The mole ratio of 2,6-xylenol:MN(II) was 100:1.

EXAMPLE IV

10 Grams of 2,6-xylenol, 93.4 ml. of toluene, 11.4 ml. of methanol, 0.1031 g. of manganese(II) chloride, 0.2737 g. of 5-methyl-salicylaldoxime and 0.4 g. of 50% aqueous sodium hydroxide were employed in the preparation of polyphenylene oxide. After 100 minutes the polymerization was neutralized with acetic acid and methanol precipitated. The precipitated polymer had a final intrinsic viscosity of 0.47 in chloroform at 25°C. The mole ratio of 2,6-xylenol:Mn(II) was 100:1.

EXAMPLE V

20 Grams of 2,6-xylenol, 110 ml. of methanol, 18 ml. of methanol, 0.2051 g. of manganese(II) chloride, 0.5385 g. of 2-hydroxy-5-methylacetophenoneoxime and 0.8 g. of 50% aqueous sodium hydroxide were employed in the preparation of polyphenylene oxide. After 75 minutes the polymerization was neutralized with acetic acid and methanol precipitated. The precipitated polymer had a final intrinsic viscosity of 0.54 in chloroform at 25°C. The mole ratio of 2,6-xylenol:Mn(II) was 100:1.

EXAMPLE VI

200 Grams of 2,6-xylenol, 100 ml. of toluene, 250 ml. of methanol, 2.75 g. of a manganese(II) bis(salicylaldoxime) chelate catalyst prepared by dissolving 0.85 g. of manganese(II) chloride and 1.90 g. of salicylaldoxime in ≈ 100 ml. of methanol, and 10.0 g. of a 50% aqueous sodium hydroxide solution were charged to a reactor. Oxygen in amounts sufficient to provide 40 psig pressure was charged to the reactor. The reaction medium was maintained at a constant 25°± 2°C. temperature during the polymerization of the 2,6-xylenol. After the polymerization reaction had proceeded for 40 minutes a polyphenylene oxide polymer having an intrinsic viscosity of 0.49 in chloroform at 25°C. was obtained. The reaction mole ratio of 2,6-xylenol:Mn(II) was 240:1.

The intrinsic viscosity value of 0.49 obtained in 40 minutes illustrates that a manganese(II) chelate catalyst has improved catalytic properties when employed in the presence of oxygen at superatmospheric pressures.

EXAMPLE VII

200 Grams of 2,6-xylenol, 1700 ml. of chlorobenzene, 250 ml. of methanol, 2.75 g. of a manganese(II) bis(salicylaldoxime) chelate catalyst prepared by dissolving 1.90 g. of salicylaldoxime in ≈ 100 ml. of methanol, and 10.0 grams of a 50% aqueous sodium hydroxide solution were charged to a reactor. Oxygen in amounts sufficient to provide 40 psig pressure was charged to the reactor. The reaction medium was maintained at a constant 25°± 2°C. temperature during the polymerization of the 2,6-xylenol. After the polymerization reaction had proceeded for 60 minutes a polyphenylene oxide polymer having an intrinsic viscosity of 0.43 in chloroform at 25°C. was obtained. The reaction mole ratio of 2,6-xylenol:Mn(II) was 240:1.

The intrinsic viscosity value of 0.43 obtained in 60 minutes illustrates, as does the previous example, that a manganese(II) chelate catalyst has improved catalytic properties when employed in the presence of oxygen at superatmospheric pressures.

From the foregoing examples, it will be apparent that o-hydroxyareneoxime chelate catalysts are effective oxidative coupling catalysts in the self-condensation of phenol to polyphenylene oxide.

The polyphenylene oxide resins prepared by the process of this invention are suited because of their excellent physical, mechanical, chemical and film properties in a similar manner to polyphenylene oxide resins prepared by other methods well-known to those skilled in the art — including U.S. Pat. No. 3,306,875 — to a wide and varied variety of uses. For example, they can be used in molding powder formulations where they can be molded, calendered, or extruded as films, coatings, threads, filaments, tapes and the like. The polymers may also be combined with various fillers, modifying agents, etc., such as dies, pigments, stabilizers, plasticizers, etc.

Other modifications and variations of the present invention are possible in light of the above teachings. It is, therefore, to be understood that changes may be made in the particular embodiments of the invention described which are within the full intended scope of the invention as defined by the appended claims.

What I claim as new and desire to secure by Letters Patent in the United States is:

1. A process of forming self-condensation products of a phenol having the structural formula:

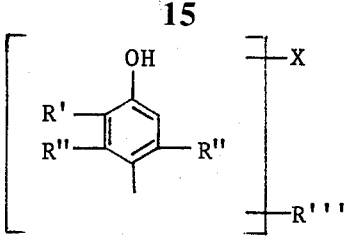

where X is a substituent selected from the group consisting of hydrogen, chlorine, bromine, and iodine; R' is a monovalent constituent selected from the group consisting of hydrogen, hydrocarbon radicals, halohydrocarbon radicals having at least two carbon atoms between the halogen atoms and phenol nucleus, hydrocarbonoxy radicals, and halohydrocarbonoxy radicals having at least two carbon atoms between the halogen atoms and phenol nucleus, R'' and R''' being the same as R' and, in addition, halogen, under reaction conditions which comprise contacting said phenol with oxygen in a basic reaction medium and in the presence of a manganese chelate complex of the formula:

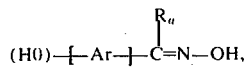

wherein L is an ortho-hydroxyareneoxime ligand of the formula:

$$(HO)\text{—}[\text{—Ar—}]\text{—}\overset{R_a}{\underset{}{C}}=N\text{—OH},$$

wherein independently $R_a$ is selected from the group consisting of hydrogen and lower alkyl radicals having from one to five carbon atoms, Ar is at least a divalent arene radical having at least —OH radical and at least one

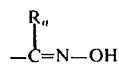

radical attached directly to an ortho positioned arene ring carbon atom, and x is a positive number at least equal to about 1.

2. The process of claim 1, wherein $R_a$ is selected from lower alkyl radicals having from one to two carbon atoms.

3. The process of claim 1, wherein said arene radical is selected from the group consisting of monocyclic and polycyclic organic radicals having from about 6 to about 30 carbon atoms.

4. The process of claim 1 where said contacting is carried out in the presence of a primary amine.

5. The process of claim 1, wherein said amine has the formula $$R^2\text{—}(NH_2)_y.$$

wherein $R^2$ is selected from mono- and polyvalent aliphatic and aromatic radicals, $y$ is a positive integer at least equal to 1, subject to the proviso that (a) at least three carbon atoms separate any amino —(NH$_2$) group from any other amino —(NH$_2$) group, and (b) at least two carbon atoms separate any amino group —(NH$_2$) from any other nucleophile.

6. The process of claim 5, wherein said y is at least equal to about 2.

7. A process in accordance with claim 26, wherein said amine is selected from the group consisting of polyamino substituted mono- and polycyclic aliphatic and aromatic compounds.

8. The process of claim 1, wherein said contacting is carried out in the presence of an alkali metal base.

9. The process of claim 1, wherein said contacting is carried out at a temperature within the range of from about 0° to about 50°C.

10. The process of claim 1, wherein said range is from about 20° to about 30°C.

11. The process of claim 1, wherein said contacting is carried out at superatmospheric oxygen pressure.

12. The process of claim 1, wherein said a phenol is 2,6-dimethylphenol.

13. The process of claim 1, wherein said complex is of the formula

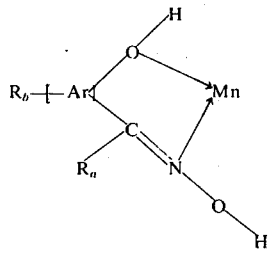

wherein $R_a$ is independently selected from the group consisting of hydrogen and lower alkyl radicals having from 1 to 5 carbon atoms, Ar is at least a divalent arene radical having at least one —OH radical and at least one

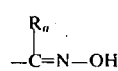

radical attached directly to ortho positioned arene ring carbon atoms, and $R_b$ is selected from the group consisting of hydrogen, or alkyl, cycloalkyl, aryl, amino, monoalkylamino, dialkylamino, halide, hydroxy, alkoxy, alkanoate radicals and combinations thereof.

14. The process of claim 1, wherein said complex is of the formula:

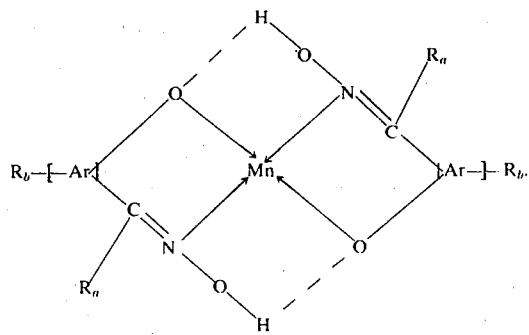

15. The process of claim 1, wherein said complex is a Mn(II) bis(salicylaldoxime) chelate of the formula:

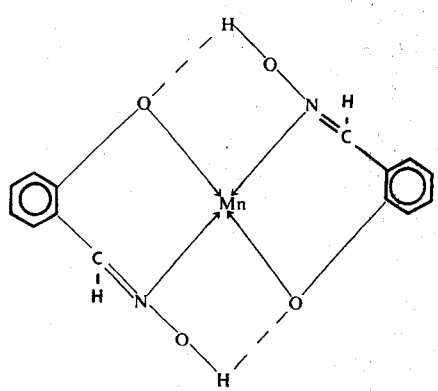

16. The process of claim 1, wherein said complex is a Mn(II) bis(2-hydroxy-5-bromophenylaldoxime) chelate of the formula:

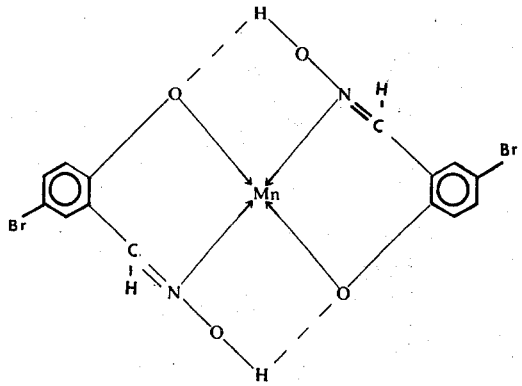

17. The proces of claim 1, wherein said complex is a Mn(II) bis(2-hydroxy-5-methoxyphenylaldoxime) chelate of the formula:

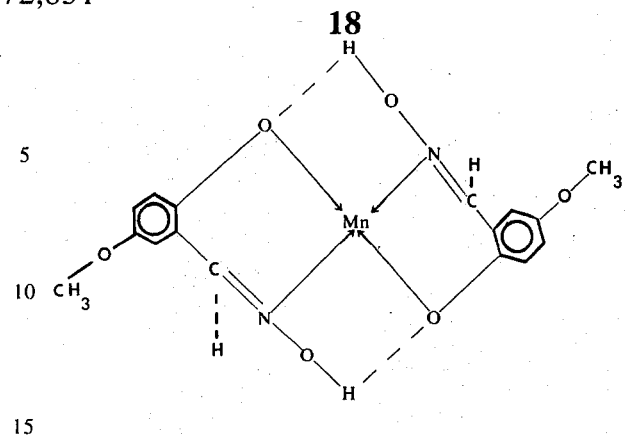

18. The process of claim 1, wherein said complex is a Mn(II) bis(2-hydroxy-acetophenoneoxime) chelate of the formula:

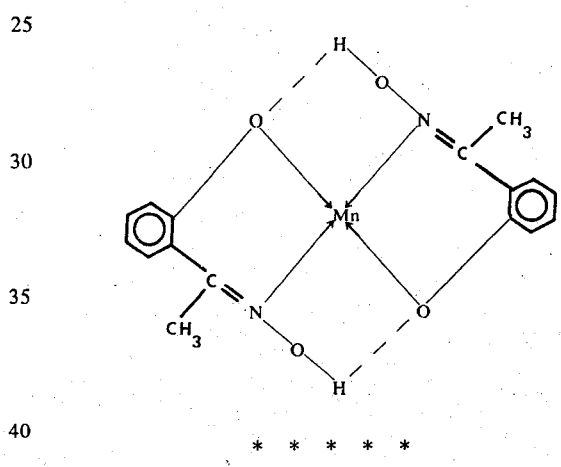

* * * * *